United States Patent
Dutta et al.

(10) Patent No.: US 9,982,198 B2
(45) Date of Patent: May 29, 2018

(54) PROCESSES FOR PRODUCING BIOMASS-DERIVED PYROLYSIS OILS

(71) Applicant: UOP LLC, Des Plaines, IL (US)

(72) Inventors: Kanchan Dutta, West Bengal (IN); Anjan Ray, New Delhi (IN); Krishna Mani, Haryana (IN); Avnish Kumar, Rajasthan (IN)

(73) Assignee: UOP LLC, Des Plaines, IL (US)

( * ) Notice: Subject to any disclaimer, the term of this patent is extended or adjusted under 35 U.S.C. 154(b) by 0 days. days.

(21) Appl. No.: 15/282,678

(22) Filed: Sep. 30, 2016

(65) Prior Publication Data
US 2017/0096605 A1    Apr. 6, 2017

Related U.S. Application Data

(60) Provisional application No. 62/235,785, filed on Oct. 1, 2015.

(51) Int. Cl.
  *C10G 3/00* (2006.01)
  *C10G 1/06* (2006.01)

(52) U.S. Cl.
  CPC .......... *C10G 3/45* (2013.01); *C10G 1/06* (2013.01); *C10G 2300/1011* (2013.01)

(58) Field of Classification Search
  CPC ..... C10G 3/45; C10G 1/06; C10G 2300/1011
  See application file for complete search history.

(56) References Cited

U.S. PATENT DOCUMENTS

| | | | | |
|---|---|---|---|---|
| 7,259,286 | B2* | 8/2007 | Jothimurugesan | B01J 23/78 423/655 |
| 8,123,933 | B2* | 2/2012 | Bhattacharyya | B01J 23/745 208/208 R |
| 8,328,890 | B2 | 12/2012 | Reiling et al. | |
| 8,404,910 | B2 | 3/2013 | Kocal et al. | |
| 2005/0003247 | A1* | 1/2005 | Pham | C01B 3/24 48/197 R |
| 2011/0087058 | A1* | 4/2011 | Harlin | C07C 1/2078 585/240 |
| 2014/0020286 | A1* | 1/2014 | Doucet | C10G 1/10 44/605 |
| 2014/0230319 | A1 | 8/2014 | Liu et al. | |
| 2015/0051428 | A1 | 2/2015 | Dayton et al. | |
| 2015/0073181 | A1 | 3/2015 | Gorke et al. | |

OTHER PUBLICATIONS

Isha et al., "Pyrolysis-gasification of agriculture biomass wastes for hydrogen production", Journal of the Energy Institute (2011), v 84, n 2, p. 80-87.

(Continued)

*Primary Examiner* — Philip Y Louie

(57) ABSTRACT

Processes for pyrolyzing biomass. A catalyst is used to both pyrolyze and deoxygenate the biomass within the pyrolysis zone. A source of carbon monoxide is also passed to the pyrolysis reactor. The source of carbon monoxide may comprise a stream of gas that includes carbon monoxide, or a material capable of generating or being converted in carbon monoxide within the pyrolysis zone. The carbon monoxide may be used as a reactant for a water gas shift reaction or as a reducing agent to remove oxygen from oxygenated hydrocarbons. The catalyst preferably comprises iron (III) oxide.

8 Claims, 1 Drawing Sheet

(56) References Cited

OTHER PUBLICATIONS

Milne et al., "Hydrogen from Biomass", National Renewable Energy Laboratory Golden, CO. http://www.nrel.gov/docs/legosti/old/36262.pdf, 2002.

Duman et al., "Steamgasification of safflower seed cake and catalytic tar decomposition over ceria modified iron oxide catalysts" Fuel Processing Technology (2014), v 126, p. 276-283.

* cited by examiner

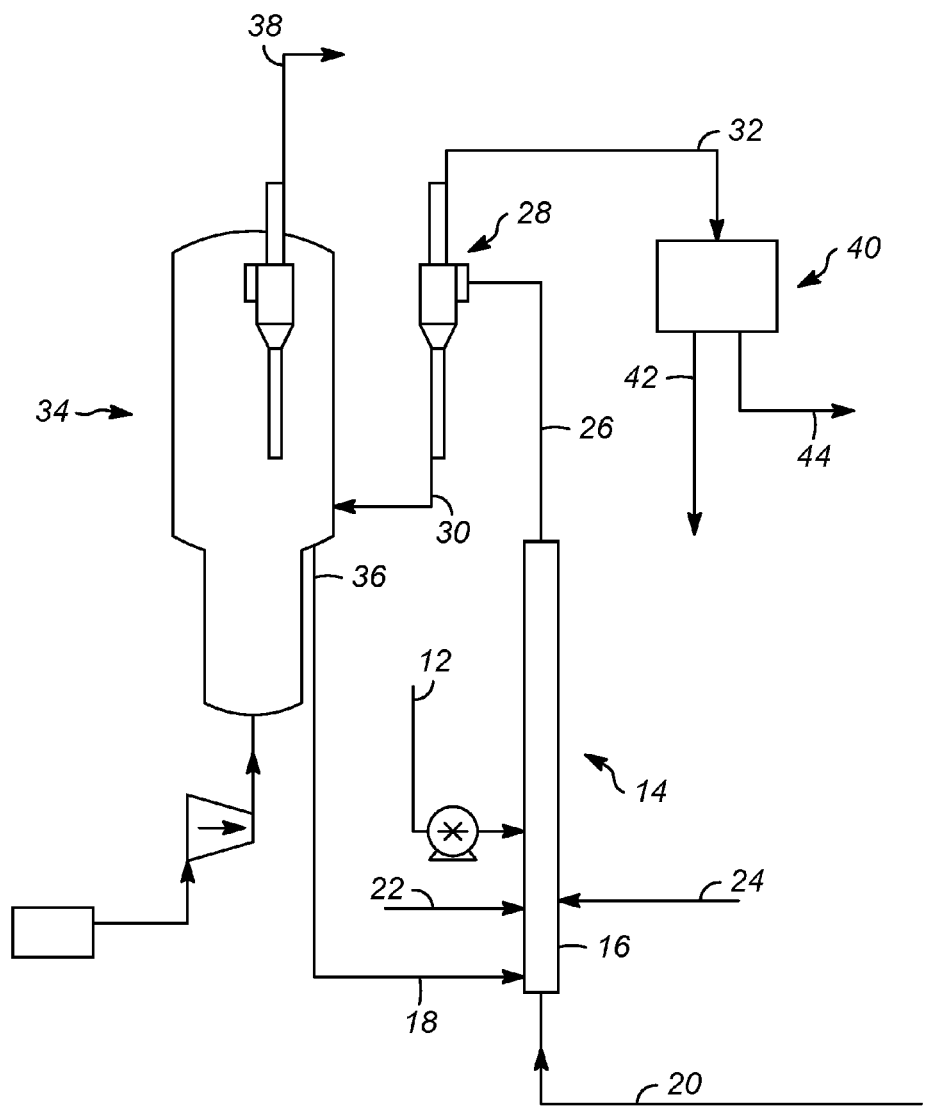

PROCESSES FOR PRODUCING BIOMASS-DERIVED PYROLYSIS OILS

CROSS-REFERENCE TO RELATED APPLICATION

This application claims priority from Provisional Application No. 62/235,785 filed Oct. 1, 2015, the contents of which are hereby incorporated by reference.

FIELD OF THE INVENTION

The present invention relates to processes for producing pyrolysis oil, and more particularly processes for producing an upgraded pyrolysis oil with a lower oxygenate amount.

BACKGROUND OF THE INVENTION

Fast pyrolysis is a thermal process during which solid carbonaceous biomass feedstock, i.e., "biomass", such as wood waste, agricultural waste, etc., is rapidly heated to pyrolysis temperatures of about 400 to about 800° C. (752 to 1,472° F.) in the absence of air using a pyrolysis reactor. Under these conditions, solid, liquid, and gaseous pyrolysis products are formed. A condensable portion (vapors) of the gaseous pyrolysis products is condensed into biomass-derived pyrolysis oil. Conventional biomass-derived pyrolysis oil is generally thermally unstable and acidic (as measured by the total acid number (TAN)), making it corrosive, typically with low energy density relative to hydrocarbon fossil fuels. Thermal instability of biomass-derived pyrolysis oil leads to increased viscosity over time. The low energy density and poor thermal stability of the biomass-derived pyrolysis oil is attributable in large part to oxygenated hydrocarbons in the oil, which undergo secondary reactions during storage. Such oxygenated hydrocarbons include carboxylic acids, phenols, cresols, aldehydes, etc. The oxygenated hydrocarbons in the oil are derived from oxygenated hydrocarbons in the gaseous pyrolysis products produced during pyrolysis of solid biomass.

Biomass-derived pyrolysis oil can be burned directly as fuel for certain boiler and furnace applications, and can also serve as a potential feedstock in the production of biofuels in petroleum refineries or in stand-alone process units. Biomass-derived pyrolysis oil also has the potential to partially replace transportation fuels, thereby reducing the dependency on conventional petroleum and reducing its environmental impact. However, conversion of biomass-derived pyrolysis oil into biofuels suitable for transportation applications in unmodified equipment used for conventional fossil fuels and, in some cases, for production of chemicals, requires full or partial deoxygenation of the biomass-derived pyrolysis oil. While some deoxygenation occurs from the elimination of carbon oxides during conventional pyrolysis of the carbonaceous biomass feedstock, such deoxygenation is insufficient to produce high energy density, thermally stable biomass-derived pyrolysis oils from which biofuels and chemicals are derived.

Most efforts to deoxygenate the biomass-derived pyrolysis oils involve secondary upgrading of the biomass-derived pyrolysis oils after their production, i.e., post-pyrolysis, typically in a separate reactor or downstream process unit. Such secondary upgrading, however, adds unnecessary cost and complexity to the production of low oxygen biomass-derived pyrolysis oil.

Accordingly, it is desirable to provide process for producing biomass-derived pyrolysis oil which requires less or no secondary upgrading. Furthermore, other desirable features and characteristics of the present invention will become apparent from the subsequent detailed description of the invention and the appended claims, taken in conjunction with the accompanying drawing and this background of the invention.

SUMMARY OF THE INVENTION

One or more processes have been invented in which chemical reactions which reduce oxygenates of the pyrolized effluent within the pyrolysis zone. The reduction is promoted by the pyrolysis catalyst as well as carbon monoxide.

Therefore, in a first embodiment of the invention, the present invention may be characterized broadly as providing a process for producing biomass derived pyrolysis oil by: pyrolyzing a carbonaceous biomass feedstock in a pyrolysis zone having a catalyst and being configured to provide a pyrolized effluent including oxygenated hydrocarbons; deoxygenating oxygenated hydrocarbons within the pyrolysis zone; and, increasing an amount of carbon monoxide in the pyrolysis zone with a source of carbon monoxide. The source of carbon monoxide is different than the carbonaceous biomass feedstock.

In one or more embodiments of the present invention, the catalyst comprises iron (III) oxide. It is contemplated that the catalyst comprises hematite. It is also contemplated that the catalyst further comprises silicon oxides, primarily silicon dioxide, which also functions as a heat carrier for maintaining the temperature of the reaction zone.

In some embodiments of the present invention, the process includes reacting water in the presence of the catalyst with carbon monoxide to provide hydrogen gas and carbon dioxide.

In various embodiments of the present invention, the catalyst comprises a portion of pitch. It is contemplated that a second portion of the pitch comprises the source of carbon monoxide.

In some embodiments of the present invention, the process includes regenerating catalyst in a regeneration zone, the regeneration zone providing an off gas including carbon monoxide. It is contemplated that at least a portion of the off gas comprises the source of carbon monoxide.

In a second aspect of the present invention, the present invention may be generally characterized as providing a process for producing biomass derived pyrolysis oil by: passing a carbonaceous biomass feedstock into a pyrolysis zone having a catalyst and configured to pyrolyze the carbonaceous biomass feedstock and provide at least oxygenated hydrocarbons; passing a source of carbon monoxide to the pyrolysis zone, wherein the source of carbon monoxide is different than the carbonaceous biomass feedstock; deoxygenating at least a portion of the oxygenated hydrocarbons within the pyrolysis zone with the catalyst and carbon monoxide to provide a pyrolized effluent; and, recovering the pyrolized effluent from the pyrolysis zone.

In some embodiments of the present invention, the catalyst comprises iron (III) oxide. It is contemplated that the process includes reacting water in the presence of the catalyst with carbon monoxide to provide hydrogen gas and carbon dioxide.

In various embodiments of the present invention, the catalyst comprises a portion of pitch. It is contemplated that a second portion of the pitch comprises the source of carbon monoxide.

In at least one embodiment of the present invention, the process includes passing a pitch to the pyrolysis zone. The pitch may include both the catalyst and the source of carbon monoxide.

In at least one embodiment of the present invention, the process includes generating hydrogen gas within the pyrolysis zone.

In one or more embodiments of the present invention, the catalyst comprises iron oxide and the process includes reducing iron oxide to iron within the pyrolysis zone. It is contemplated that the process also includes generating hydrogen within the pyrolysis zone with the iron.

In some embodiments of the present invention, the source of carbon monoxide generates carbon monoxide within the pyrolysis zone.

In various embodiments of the present invention, the process includes passing catalyst to a regeneration zone configured to burn coke and regenerate the catalyst and provide an off gas including carbon monoxide and, passing at least a portion of the off gas to the pyrolysis zone as the source of carbon monoxide.

Additional aspects, embodiments, and details of the invention, all of which may be combinable in any manner, are set forth in the following detailed description of the invention.

DETAILED DESCRIPTION OF THE DRAWING

One or more exemplary embodiments of the present invention will be described below in conjunction with the following drawing FIGURE, in which:

The FIGURE shows process flow diagram of one or more embodiments of the present invention.

DETAILED DESCRIPTION OF THE INVENTION

As mentioned above, various processes have been invented in which oxygenates of the pyrolized effluent are reduced within the pyrolysis zone. The reduction is promoted by the pyrolysis catalyst as well as carbon monoxide. With respect to the catalyst, iron (III) oxide can act as a catalyst for both the pyrolysis reaction, but also for the deoxygenation reactions from the oxygenated molecules. The removal of an oxygen atom from a hydrocarbon can occur via various reaction pathways which are collectively referred to herein as "deoxygenation" reactions. For example, the following reactions may be involved in removing some of the oxygen atoms from the oxygenated molecules:

(Decarboxylation)   $C_nH_{2n+1}COOR+H_2=C_nH_{2n+2}+CO_2+RH$;
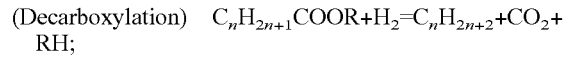
(Decarbonylation)   $C_nH_{2n+1}COOR+2H_2=C_nH_{2n+2}+CO+H_2O+RH$; and,
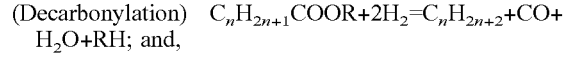
(Hydrodeoxygenation)   $C_nH_{2n+1}COOR+4H_2=C_{n+1}H_{2(n+2)}+2H_2O+RH$.
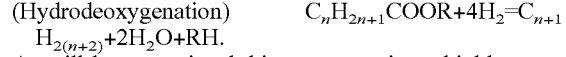

As will be appreciated, biomass contains a highly complex system of oxygenated molecules and the above mentioned reactions are merely representative of different types of deoxygenation reactions. The various deoxygenation reactions typically consumes a significant amount of hydrogen. The iron (III) oxide catalyst can, via the water gas shift reaction, create hydrogen gas from the water and carbon monoxide produce during the pyrolysis. Additionally, the iron (III) oxide catalyst can also be reduced within the pyrolysis zone by carbon monoxide to provide iron. The iron can produce hydrogen via the steam-iron reaction. Thus, the iron (III) oxide can be used as a catalyst for both the pyrolysis reactions, as well as for the deoxygenation reactions and the water gas shift reaction.

As will be appreciated the foregoing deoxygenation reactions all require hydrogen. Furthermore, the reactions that generate hydrogen typically consume carbon monoxide. However, carbon monoxide can be used as a reducing agent to remove oxygen from hydrocarbons. See, EP 2 177 587. The reaction pathways do not require a significant amounts and are believed to be a 1:1 stoichiometric relationship. Thus, unlike prior processes, the present invention promotes the deoxygenation reactions of the hydrocarbons by adding in a source of carbon monoxide.

"Hydrocarbons" as used herein are organic compounds that contain principally hydrogen and carbon, i.e., "hydrocarbons" are oxygen-free. "Hydrocarbons" include both aromatic and non-aromatic hydrocarbons. Exemplary aromatic hydrocarbons include benzene, toluene, ethylbenzene, p-xylene, and o-xylene. "Oxygenated hydrocarbons" as used herein are organic compounds containing hydrogen, carbon, and oxygen. Exemplary oxygenated hydrocarbons produced from pyrolysis include carboxylic acids such as acetic acid, phenols, cresols, and aldehydes such as furfural, levoglucosan, etc.

With these general principles in mind, one or more embodiments of the present invention will be described with the understanding that the following description is not intended to be limiting.

As shown in the FIGURE, a carbonaceous biomass feedstock 12 (hereinafter "biomass") is introduced into a pyrolysis reaction zone 14 having a pyrolysis reactor 16. Various types of biomass may be pyrolyzed. Virtually any form of biomass can be considered for pyrolysis to produce biomass-derived pyrolysis oil. Biomass-derived pyrolysis oil may be derived from biomass material such as wood, agricultural wastes/residues, nuts and seeds, algae, grasses, forestry byproducts, cellulose and lignin, municipal waste, construction/demolition debris, or the like. The moisture in the biomass may be reduced by known drying methods prior to introduction into the pyrolysis reactor, however, as will be discussed below, the present invention includes a catalyst that produces hydrogen from the water shift reaction, and thus the biomass does not need to be completely dry for pyrolysis. Grinding of the biomass may also be performed prior to pyrolysis.

A circulating fluidizing bed reactor (CFBR) is a preferred pyrolysis reactor 16. One such circulating bed transport reactor for use in fast pyrolysis is described, for example, in U.S. Pat. No. 5,961,786. Briefly, as is known, the carbonaceous biomass feedstock 12, essentially oxygen-free fluidizing gas, and a heat transfer medium 18 are rapidly mixed in a thermal mixing section of a pyrolysis reactor base section, then transported upward through an entrained-bed tubular reactor. After fast pyrolysis, a cyclonic hot solids recirculation system separates the solid heat transfer medium from the non-condensable pyrolysis gases and condensable pyrolysis gases (vapors) and returns the heat transfer medium 18 to the mixing section to be used again. The heat required to drive the pyrolysis process is transferred to the mixing and reaction zones principally by recirculated heat transfer medium 18. Typically, there is no oxidation (combustion) occurring in the mixing and reaction zones to supply direct process heat as preferably there is very little oxygen present. Direct or indirect combustion of char or gas, or externally supplied fuel, or indirect electrical resistance heating may be employed to heat the recirculated heat transfer medium 18 before injection into the mixing section of the pyrolysis reactor 16. It is to be understood that the fast pyrolysis methods described above are exemplary. In addition, while mixing of the carbonaceous biomass feedstock 12 with a heat transfer medium 18 in the mixing section of a pyrolysis reactor 16 has been described, the carbonaceous biomass feedstock 12 may be mixed with the heat transfer medium 18 prior to introduction into the pyrolysis reactor 16.

The biomass may be pyrolyzed using various pyrolysis methods including fast pyrolysis and other pyrolysis methods such as vacuum pyrolysis, slow pyrolysis, and others. Fast pyrolysis includes rapidly imparting a relatively high temperature to feedstocks for a very short residence time, typically about 0.5 seconds to about 0.5 minutes, and then rapidly reducing the temperature of the pyrolysis products before chemical equilibrium can occur. By this approach, the complex structures of the biomass are broken into reactive chemical fragments that are initially formed by depolymerization and volatilization reactions, but do not persist for any significant length of time. Fast pyrolysis is an intense, short duration process that can be carried out in a variety of pyrolysis reactors such as fixed bed pyrolysis reactors, fluidized bed pyrolysis reactors, circulating fluidized bed reactors (CFBR), or other pyrolysis reactors capable of fast pyrolysis as known in the art. For example, in an exemplary fluidized bed pyrolysis reactor, carbonaceous biomass feedstock 12 is thermally converted (i.e., pyrolyzed) at pyrolysis temperatures (about 400 to about 800° C. (752 to 1,472° F.)) in the presence of a heat transfer medium 18.

The heat transfer medium 18 tropically comprises inert solids such as sand, catalytic solids, or a combination thereof. However, the heat required to drive the pyrolysis process may be derived from other sources (e.g., an organic heat source such as char) as well known in the art. The heat transfer medium 18 may be provided in a fluidized state and maintained at a temperature suitable for pyrolysis to pyrolyze the carbonaceous biomass feedstock. In one embodiment, the heat transfer medium 18 may be fluidized by a fluidizing gas 20. As will be described below, flue gases from the pyrolysis reactor 16 or a non-condensable portion of the pyrolysis effluent are compressed and fed into the pyrolysis reactor 16 as the fluidizing gas 20 for bed fluidization. The heat transfer medium 18 forms a fluidized bed within the pyrolysis reactor 16.

In the various embodiments of the present invention, the pyrolysis reactor 16 also receives a catalyst 22, which may be mixed with the heat transfer medium 18, or which may act entirely as the heat transfer medium 18. As used herein, a "catalyst" is defined as solid material comprising at least an active phase. The catalyst may also comprise a support material. The support material acts as a locus for combining the catalyst components together; in some cases, the support material may also have catalytic activity. The active phase contains one or more components that catalyze the desired chemical transformation. Optionally, one or more modifiers or additives may be added to the catalyst. These modifiers and/or additives serve to optimize the catalyst activity, selectivity, or stability for a specific application.

The catalyst 22 typically used during the pyrolysis process is a base metal-based catalyst, a noble metal-based catalyst, a treated zeolitic catalyst, or a combination thereof. The step of pyrolyzing the carbonaceous biomass feedstock in the presence of the catalyst comprises contacting the carbonaceous biomass feedstock and/or pyrolysis gases with the catalyst. However, in addition to catalyzing the pyrolysis reaction, the catalyst also catalyzes the deoxygenation of the oxygenated hydrocarbons produced in the pyrolysis reaction.

The pyrolysis process produces a carbon-containing solid (char), and pyrolysis gases comprising a variety of oxygenated hydrocarbons, heavy hydrocarbons which include partially depolymerized biomass and light (C1-C4) hydrocarbons, carbon oxides, hydrogen gas, and steam. The oxygenated hydrocarbons include carboxylic acids, phenols, cresols, aldehydes, etc. that contribute to the thermal instability and corrosivity of conventional pyrolysis products. Accordingly, according to the present invention, the oxygenated hydrocarbons are deoxygenated in the pyrolysis reaction zone 14 with at least the catalyst.

In various embodiments of the present invention, the catalyst comprises iron (III) oxide. The catalyst may comprise hematite or an iron (III) oxide-silicon oxide system. The catalyst may comprise approximate 74.2 wt % iron (III) oxide. The iron (III) oxide will act to catalyze both the pyrolysis and the deoxygenation reactions. Furthermore, the iron (III) oxide will also generate hydrogen in situ by catalyzing the water gas shift reaction with water from the biomass or produced by deoxygenation reactions. Additionally, within the pyrolysis reaction zone, the iron (III) oxide may reduced to produce iron. Concomitantly, the iron may be regenerated as discussed below and can be used to generate hydrogen by steam-iron reaction in which steam from some of the deoxygenation reactions and/or with water from the carbonaceous biomass feedstock 12, will react with iron to produce iron oxides and hydrogen. See, for example, U.S. Pat. No. 3,442,620. The hydrogen generated by any of these reactions can be utilized for the deoxygenation reactions within the pyrolysis reaction zone 14, further lowering the oxygenate level in the resultant effluent produced. When using an iron (III) oxide catalyst, a temperature of the pyrolysis reaction zone 14 is about 500° C. (932° F.).

As is known, the water gas shift reaction will consume carbon monoxide. However, it has been shown that carbon monoxide can be used as a reducing agent to remove oxygen from oxygenated hydrocarbons. Therefore, it is also desirable to provide a source of carbon monoxide 24 to the pyrolysis reaction zone 14 that is different that the carbonaceous biomass feedstock 12. As will be discussed in more detail below, the source of carbon monoxide 24 may comprise a gaseous stream comprising carbon monoxide, as well as other gases. Alternatively, the carbon monoxide source 24 may generate additional carbon monoxide in situ without deoxygenating the oxygenated hydrocarbons. For example, carbon could be used to react with water to provide water gas, which includes carbon monoxide (which can be used as a reducing agent, as well as a reactant in the water gas shift reaction) and hydrogen (which is beneficial within the reactor as discussed above for the deoxygenation reactions).

One particularly preferred source of carbon monoxide 24 is pitch. The term "pitch" is understood to refer vacuum residue, or material having an atmospheric equivalent boiling point (AEBP) of greater than 524° C. 975° F. (975° F.) (as calculated from the observed boiling temperature and the distillation pressure, for example using the equations furnished in ASTM D1160). Pitch typically comprises a waste product that is leftover from various refinery processing reactions, for example a slurry hydrocracking reaction. Any carbon in the pitch could be used as a source of carbon monoxide 24 within the pyrolysis reaction zone 14.

Additionally, some pitch producing processes utilize a catalyst that includes iron oxide. See, e.g., U.S. Pat. No. 8,123,933. Accordingly, it is believed that the pitch form such processes are particularly useful according to the present invention. Therefore, in such instances, the pitch includes a portion that may comprises the catalyst 22 for pyrolysis/deoxygenation/water gas shift, as well as a second portion that may comprise the source of carbon monoxide 24.

Once the carbonaceous biomass feedstock 12 has been pyrolized and some of, preferably most of, and most preferably almost all of, the oxygenated hydrocarbons have been deoxygenated, a stream 26 of solid carbon-containing char and pyrolysis gases being a deoxygenated (and pyrolized) effluent exits the pyrolysis reaction zone 14.

The solid char may be separated from the pyrolysis gases in a separation zone 28 that includes, for example, a cyclone separator, and which will produce a solids stream 30 and a pyrolysis effluent stream 32. The solids stream 30, comprising the catalytic solids, the char, the heat transfer medium, or a combination thereof, may be passed to a regeneration zone 34. As is known in the art, in the regeneration zone 34 the catalyst and the heat transfer medium may be regenerated and coke may be burned to provide the heat to regenerate the catalyst and the heat transfer medium. The regeneration will provide a stream 36 of catalyst, heat transfer medium or both, which may be recycled back to the pyrolysis reaction zone 14. In addition, the regeneration zone 34 will provide an off gas 38 that may include carbon monoxide, carbon dioxide, water vapor and small quantities of unburned hydrocarbons containing up to 8 carbons. Accordingly, as mentioned above, the off gas 38, or at least a portion thereof, may be passed to back to the pyrolysis reaction zone 14 as the source of carbon monoxide 24, or as the fluidizing gas 20, or both.

The pyrolysis effluent stream 32 may be passed from the separation zone 28 to a condenser 40, or series of condensers. A non-condensable portion 42 of the pyrolysis effluent stream 32 may be recovered for other uses (not shown) (e.g., as a fluidizing gas 20). The non-condensable portion 42 comprises hydrogen gas, methane, and carbon oxides which may be separated from each other by methods well known in the art, or used as the carbon monoxide source 24 for the pyrolysis reaction zone 14.

A condensable (vapor) portion of the pyrolysis effluent stream 32 comprising hydrocarbons and any residual oxygenated hydrocarbons may be condensed into a low oxygen biomass-derived pyrolysis oil 44 having substantially improved energy density, lower total acid number (TAN), and higher thermal stability than conventional biomass-derived pyrolysis oil. The low oxygen biomass-derived pyrolysis oil 44 has potential for use as a biofuel substantially eliminating the need for secondary upgrading to remove oxygen therefrom as is needed with conventional biomass-derived pyrolysis oils.

By utilizing a catalyst for deoxygenation reaction within the pyrolysis zone, the amount of oxygenated hydrocarbons in the effluent from the reactor may be reduced. Furthermore, some catalysts, such as those containing iron, can also react with water to produce hydrogen. Hydrogen may also be produced by any iron that is formed by the reduction of iron oxides in such catalyst compositions. See, for example, Mondal et al, FUEL PROCESSING TECHNOLOGY, Volume 86, Issue 1, 15 Nov. 2004, Pages 33-47. Carbon monoxide may also be used to reduce the oxygenated hydrocarbons. Some pitch products may be particularly useful in that they can act as a source for both carbon monoxide and iron (III) oxide catalysts-thus increasing the yield of the pyrolysis reactor and providing an outlet for what is conventionally a waste or undesirable byproduct.

It should be appreciated and understood by those of ordinary skill in the art that various other components such as valves, pumps, filters, coolers, etc. were not shown in the drawing as it is believed that the specifics of same are well within the knowledge of those of ordinary skill in the art and a description of same is not necessary for practicing or understanding the embodiments of the present invention.

Specific Embodiments

While the following is described in conjunction with specific embodiments, it will be understood that this description is intended to illustrate and not limit the scope of the preceding description and the appended claims.

A first embodiment of the invention is a process for producing biomass derived pyrolysis oil, the process comprising pyrolyzing a carbonaceous biomass feedstock in a pyrolysis zone having a catalyst to provide a pyrolized effluent including oxygenated hydrocarbons; deoxygenating oxygenated hydrocarbons within the pyrolysis zone; and, increasing an amount of carbon monoxide in the pyrolysis zone with a source of carbon monoxide, wherein the source of carbon monoxide is different than the carbonaceous biomass feedstock. An embodiment of the invention is one, any or all of prior embodiments in this paragraph up through the first embodiment in this paragraph wherein the catalyst comprises iron (III) oxide. An embodiment of the invention is one, any or all of prior embodiments in this paragraph up through the first embodiment in this paragraph wherein the catalyst comprises hematite. An embodiment of the invention is one, any or all of prior embodiments in this paragraph up through the first embodiment in this paragraph wherein the catalyst further comprises silicon oxide. An embodiment of the invention is one, any or all of prior embodiments in this paragraph up through the first embodiment in this paragraph further comprising reacting water in the presence of the catalyst with carbon monoxide to provide hydrogen gas and carbon dioxide. An embodiment of the invention is one, any or all of prior embodiments in this paragraph up through the first embodiment in this paragraph wherein the catalyst comprises a portion of pitch. An embodiment of the invention is one, any or all of prior embodiments in this paragraph up through the first embodiment in this paragraph wherein a second portion of the pitch comprises the source of carbon monoxide. An embodiment of the invention is one, any or all of prior embodiments in this paragraph up through the first embodiment in this paragraph further comprising regenerating catalyst in a regeneration zone, the regeneration zone providing an off gas including carbon monoxide. An embodiment of the invention is one, any or all of prior embodiments in this paragraph up through the first embodiment in this paragraph wherein at least a portion of the off gas comprises the source of carbon monoxide.

A second embodiment of the invention is a process for producing biomass derived pyrolysis oil, the process comprising passing a carbonaceous biomass feedstock into a pyrolysis zone having a catalyst and configured to pyrolyze the carbonaceous biomass feedstock and provide at least oxygenated hydrocarbons; passing a source of carbon monoxide to the pyrolysis zone, wherein the source of carbon monoxide is different than the carbonaceous biomass feedstock; deoxygenating at least a portion of the oxygenated hydrocarbons within the pyrolysis zone with the catalyst and carbon monoxide to provide a pyrolized effluent; and, recovering the pyrolized effluent from the pyrolysis zone. An embodiment of the invention is one, any or all of prior embodiments in this paragraph up through the second embodiment in this paragraph wherein the catalyst comprises iron (III) oxide. An embodiment of the invention is one, any or all of prior embodiments in this paragraph up through the second embodiment in this paragraph further comprising reacting water in the presence of the catalyst with carbon monoxide to provide hydrogen gas and carbon dioxide. An embodiment of the invention is one, any or all of prior embodiments in this paragraph up through the second embodiment in this paragraph wherein the catalyst comprises a portion of pitch. An embodiment of the invention is one, any or all of prior embodiments in this paragraph up through the second embodiment in this paragraph wherein a second portion of the pitch comprises the source of carbon monoxide. An embodiment of the invention is one, any or all of prior embodiments in this paragraph up through the second embodiment in this paragraph further comprising passing a pitch to the pyrolysis zone, wherein the pitch includes both the catalyst and the source of carbon monoxide. An embodiment of the invention is one, any or all of prior embodiments in this paragraph up through the second embodiment in this paragraph further comprising generating hydrogen gas within the pyrolysis zone. An embodiment of the invention is one, any or all of prior embodiments in this paragraph up through the second embodiment in this paragraph wherein the catalyst comprises iron oxide and wherein the process includes reducing iron oxide to iron within the pyrolysis zone. An embodiment of the invention is one, any or all of prior embodiments in this paragraph up through the second embodiment in this paragraph further comprising generating hydrogen within the pyrolysis zone with the iron. An embodiment of the invention is one, any or all of prior embodiments in this paragraph up through the second embodiment in this paragraph wherein the source of carbon monoxide generates carbon monoxide within the pyrolysis zone. An embodiment of the invention is one, any or all of prior embodiments in this paragraph up through the second embodiment in this paragraph further comprising passing catalyst to a regeneration zone configured to burn coke and regenerate the catalyst and provide an off gas including carbon monoxide; and, passing at least a portion of the off gas to the pyrolysis zone as the source of carbon monoxide.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. A process for producing biomass derived pyrolysis oil, the process comprising:
    pyrolyzing a carbonaceous biomass feedstock in a pyrolysis zone having a catalyst to provide a pyrolyzed effluent including oxygenated hydrocarbons, wherein the catalyst comprises a portion of pitch and said pitch comprises iron oxide;
    deoxygenating oxygenated hydrocarbons within the pyrolysis zone;
    increasing an amount of carbon monoxide in the pyrolysis zone with a source of carbon monoxide, wherein the source of carbon monoxide is different than the carbonaceous biomass feedstock; and
    condensing a portion of the pyrolysis effluent to produce the biomass derived pyrolysis oil.

2. The process of claim 1 wherein the source of carbon monoxide comprises a second portion of the pitch.

3. The process of claim 1 further comprising regenerating catalyst in a regeneration zone, the regeneration zone providing an off gas including carbon monoxide.

4. The process of claim 3 wherein at least a portion of the off gas is passed to the pyrolysis zone as the source of carbon monoxide.

5. A process for producing biomass derived pyrolysis oil, the process comprising:
    passing a carbonaceous biomass feedstock into a pyrolysis zone having a catalyst and configured to pyrolyze the carbonaceous biomass feedstock and provide at least oxygenated hydrocarbons, wherein the catalyst comprises a portion of pitch and said pitch comprises iron oxide;
    passing a source of carbon monoxide to the pyrolysis zone, wherein the source of carbon monoxide is different than the carbonaceous biomass feedstock;
    deoxygenating at least a portion of the oxygenated hydrocarbons within the pyrolysis zone with the catalyst and carbon monoxide to provide a pyrolyzed effluent;
    recovering the pyrolyzed effluent from the pyrolysis zone; and
    condensing a vapor portion of the pyrolyzed effluent into said biomass derived pyrolysis oil.

6. The process of claim 5 wherein the source of carbon monoxide comprises a second portion of the pitch.

7. The process of claim 5 further comprising passing a pitch to the pyrolysis zone, wherein the pitch includes both the catalyst and the source of carbon monoxide.

8. The process of claim 5 wherein the source of carbon monoxide generates carbon monoxide within the pyrolysis zone.

* * * * *